US005766759A

United States Patent [19]

Chen et al.

[11] Patent Number: 5,766,759

[45] Date of Patent: Jun. 16, 1998

[54] FUSING ROLL HAVING AN OIL BARRIER LAYER

[75] Inventors: Jiann-Hsing Chen, Fairport; Gary F. Roberts, Macedon; Richard J. Kosakowski, Rochester, all of N.Y.

[73] Assignee: Eastman Kodak Company, Rochester, N.Y.

[21] Appl. No.: 781,274

[22] Filed: Jan. 10, 1997

[51] Int. Cl.$^6$ .............................. B32B 27/08; B32B 1/00

[52] U.S. Cl. ........................... 428/375; 428/391; 492/53; 492/56; 427/412.1

[58] Field of Search .................................... 428/375, 391; 492/53, 56; 430/99; 427/412.1

[56] References Cited

U.S. PATENT DOCUMENTS

| | | | |
|---|---|---|---|
| 4,430,406 | 2/1984 | Newkirk et al. | 430/99 |
| 4,807,341 | 2/1989 | Nielsen et al. | 29/132 |
| 5,200,284 | 4/1993 | Chen et al. | 430/33 |
| 5,233,008 | 8/1993 | Chen et al. | 528/33 |
| 5,330,840 | 7/1994 | Chen et al. | 428/423.1 |
| 5,464,698 | 11/1995 | Chen et al. | 428/421 |
| 5,534,347 | 7/1996 | Chen et al. | 428/375 |

OTHER PUBLICATIONS

*Encyclopedia of Polymer Science and Engineering*, vol. 13, pp. 292–293 (Kirk Othmer), Dec. 1988.

Official Compilation of Codes, Rules and Regulations of the State of New York, 6 NYCRR 228.7, Jan. 1994.

*Primary Examiner*—Alexander Thomas

*Attorney, Agent, or Firm*—Doreen M. Wells

[57] ABSTRACT

A release oil barrier layer is coated over the silicone rubber cushion layer of a toner fusing roll by means of a coating composition having a low VOC content and comprising an aqueous dispersion of a fluorocarbon polymer in particulate form and a water-dispersible polyurethane.

14 Claims, No Drawings

FUSING ROLL HAVING AN OIL BARRIER LAYER

FIELD OF THE INVENTION

This invention relates to toner fusing rolls having an oil barrier layer which can be coated on the roll core from an aqueous medium and to the method of forming such fusing rolls.

BACKGROUND OF THE INVENTION

In electrostatographic imaging and recording processes, for instance, in electrophotographic copying, an electrostatic latent image formed on a photoconductive surface is developed with a thermoplastic toner powder which is thereafter transferred and fused to a substrate. The fusing step consists of passing the substrate, such as a sheet of paper on which toner powder is distributed in an imagewise pattern, through the nip of a pair of heated rolls.

Toner fusing rolls are composed of a cylindrical core which may contain a heat source in its interior, and a resilient covering layer formed directly or indirectly on the surface of the core. The resilience of the roll covering improves the fusing of toner by forming a larger nip area than a non-resilient roll provides and offers other advantages. Resilient roll coverings are commonly made of silicone polymers, such as poly(dimethylsiloxane) polymers. These have low surface energy, which reduces the sticking of toner to the roll. Commonly, however, poly (dimethylsiloxane) release oils are also applied to the roll surface to prevent adherence of toner to the roll. Such silicone release oils may interact with the roll surface upon repeated use and in time cause swelling, softening and degradation of the roll. Silicone rubber covering layers which are insufficiently resistant to silicone release oils and cleaning solvents are also susceptible to delamination after repeated heating and cooling cycles.

To reduce or prevent damage to the silicone elastomer layers of fusing rolls by release oils, it is known to form over the silicone layer a barrier layer that is impervious to silicone oil. The patents to T. J. Chen et al. U.S. Pat. No. 5,534,347 and J. H. Chen et al. U.S. Pat. No. 5,200,284 disclose novel and useful oil barrier layers. To form barrier layers with the polymers described in these patents, the polymer is dissolved in an organic solvent such as methylene chloride, tetrahydrofuran or methyl ethyl ketone and coated over the silicone elastomer layer.

A need exists, however, for an oil barrier layer that can be coated over the silicone rubber layer of a fusing roll from an aqueous coating composition. More specifically, the coating composition should contain no more than a low concentration of volatile organic compounds (VOC).

Thus, in order to comply with the National Ambient Air Quality Standards, environmental regulations limit the amount of volatile organic compounds ("VOC") which can be emitted to the atmosphere. For example, in New York State, the VOC content (in pounds of VOC's per gallon of coating, not including water, at application) of coatings for "miscellaneous metal parts" is limited to 3.5 pounds per gallon. (6 NYCRR 228.7)

The present invention provides a novel fusing roll and a method of making such a roll wherein the barrier layer is coated on the roll from an aqueous coating composition that has the required low VOC content. The resulting barrier layer also has excellent adhesion to silicone rubber; it does not swell when contacted with silicone release oil and has good thermal and mechanical properties.

BRIEF SUMMARY OF THE INVENTION

The fusing roll of the invention comprises a core and, formed on said core, a resilient silicone rubber layer and, coated on said silicone layer, a barrier layer that is impervious to silicone oil and that comprises a fluorocarbon polymer dispersed in a polyurethane.

The method of the invention comprises forming on a fusing roll core a resilient silicone rubber layer and coating the silicone rubber layer with an aqueous dispersion comprising a fluorocarbon polymer, a water-dispersible polyurethane and at least one solvent for the polyurethane, drying and curing said dispersion to obtain a barrier layer comprising said fluorocarbon polymer dispersed in said polyurethane.

DETAILED DESCRIPTION

To make a fusing roll of the invention, coatings or layers are formed on a roll core. The core normally is a cylinder which can be a hollow cylinder and can be of any rigid metal or other substance having the physical properties that are commonly required of fusing roll cores. Suitable core materials include aluminum, steel and various alloys and polymers such as thermoset resins, with or without fiber reinforcement and thermal conductivity additives.

In the method of the invention, the fusing roll can be fabricated by first cleaning and drying the outer surface of the roll core and then advantageously applying a priming composition to improve the adhesion of silicone rubber to the core.

After priming and drying the core, a silicone rubber base cushion layer, which can have a thickness, e.g., of 0.25 to 12 mm and, preferably, 1.2 to 5 mm, is formed on the core by any of several useful methods, for example, by spraying a solution or dispersion of silicone elastomer on the core as described in U.S. Pat. No. 4,430,406, or by molding sheets of the elastomer on the core as disclosed in U.S. Pat. No. 4,807,341, or by ring coating as disclosed in U.S. Pat. No. 5,464,698, all of said patents being incorporated herein by reference.

The silicone elastomer can be any resilient silicone rubber such as those disclosed in U.S. Pat. No. 4,430,406, cited above, and the soft silicones disclosed in U.S. Pat. No. 5,534,347, incorporated herein by reference. Especially preferred is the condensation cured poly(dimethylsiloxane) elastomer known as EC-4952 elastomer, which is available from Emerson Cumming Co., a subsidiary of W. R. Grace & Co. Other useful silicone elastomers include, for example, Silastic® J RTV addition-cured silicone rubber, and Silastic E silicone rubber, both marketed by Dow Corning Corp. and SFR 100 silicone, available from General Electric Co. SFR 100 silicone is characterized as a silanol-terminated poly (dimethylsiloxane) having about 70 mol percent of difunctional dimethylsiloxane repeating units and about 30 mol percent of a mixture of monofunctional (trimethylsiloxane) and tetrafunctional ($SiO_2$) repeating units and having a number-average molecular weight of about 150,000. EC-4952 silicone is characterized as a silanol-terminated polydimethylsiloxane having about 85 mole percent of difunctional dimethylsiloxane repeating units and about 15 mole percent of trifunctional methylsiloxane repeating units, and a number-average molecular weight of about 21,000.

Useful primers for improving adhesion of the silicone rubber base cushion layer to a metal core include a metal oxide type primer such as Dow™ 1200 RTV Prime Coat silane primer, marketed by Dow Corning Corp., which is preferred when the silicone rubber is a material such as Silastic® J RTV addition cured silicone rubber, mentioned above, and GE-4044 primer, marketed by General Electric Co., which is especially useful with EC-4952 condensation cured silicone rubber, mentioned above. Other well known priming agents can also be used, although suitable adhesion of the silicone rubber layer to the core can in some cases be obtained without a primer.

After the resilient silicone elastomer layer has been formed on the roll core, the barrier layer is coated over the silicone layer from an aqueous medium, in accordance with the invention. First, however, it may be desirable to subject the silicone layer to corona discharge treatment, in known manner, to improve the adhesion of the barrier layer to the silicone layer. Such treatment is not essential, however.

The barrier layer aqueous coating composition comprises a mixture of polymers, namely, a mixture of a fluorocarbon polymer and a water-dispersible polyurethane, preferably, a polyurethane ionomer, in an aqueous medium that also contains a minor amount of one or more organic solvents for the polyurethane. An especially preferred and commercially available aqueous composition from which the barrier layer can be formed, in accordance with the invention, is the aqueous dispersion known as Xylan® 1237/Blue High Lubricity, which is available from Whitford Corporation of West Chester, Pa. This aqueous composition contains a fluorocarbon polymer in finely divided particulate form, a water-dispersible urethane random copolymer, water, an inorganic filler compound, organic solvents for the urethane polymer, namely, N-methylpyrrolidone and 2-butoxyethanol, and an optional blue pigment. The concentration of the organic solvents in Xylan® 1237 composition is approximately 3.05 pounds per gallon (366 g per liter) of the composition, minus water. More specifically, analysis shows the components and weight percentages of the composition to be as follows: polyurethane, 48–55%; polytetrafluoroethylene, 32–39%; calcium carbonate, 7–10% and copper phthalocyanine blue pigment, 2–3%.

The water-dispersible polyurethane of the Xylan 1237 composition is a random copolymer reaction product of a polyester with a diisocyanate, and can be prepared in known manner by reacting a polyester of 1,6-hexanediol and adipic acid, with "reduced methylene diphenyldiisocyanate", i.e., methylene bis(4-cyclohexyl isocyanate) to obtain a prepolymer having isocyanate and carboxy end groups. The prepolymer is then reacted with a tertiary amine to obtain the corresponding carboxylate salt of 3000 to 4000 molecular weight, which is dispersed in water and reacted with a diamine in a chain extension step.

Although the polyurethane of the Xylan 1237 composition is a preferred polyurethane for the barrier layer of the present invention, a wide range of water-dispersible polyurethanes, preferably, polyurethane ionomers, can be employed in the barrier layer composition. To prepare such polyurethanes, other suitable polyesters for reaction with a diisocyanate include polyesters of dicarboxylic acids such as adipic acid, azelaic acid, phthalic anhydride, isophthalic acid, dimethylpropionic acid, and the like with diols or polyols such as 1,6-hexanediol, neopentyl glycol, 1,4- or 1,3-butanediol, ethylene and propylene glycols, cyclohexanedimethanol, trimethylolpropane, glycerine, tris (hydroxyethyl) isocyanurate, and the like. This resulting reaction product, in a salt formation step, is reacted with an amine to form the desired polyurethane ionomer having ionic groups in the polymer backbone. As disclosed in *Encyclopedia of Polymer Science and Engineering*, Vol. 13 pages 292 and 293, and in references cited on page 302 thereof, such polyurethane ionomers form stable aqueous dispersions.

An inorganic filler compound, although not essential, is desirable in the barrier layer composition to give physical strength to the layer. Examples of other useful fillers include carbon powder, mica, iron oxide, alumina, and zinc oxide.

The barrier layer composition can contain other fluorocarbon polymers in particulate form instead of or in admixture with polytetrafluoroethylene (PTFE). Other suitable polymers include such well-known fluorocarbon polymers as fluoroethylenepropylene polymer (FEP) and perfluoroalkoxyvinylether polymer (PFA) and the vinylidenefluoride-based fluoroelastomers disclosed in U.S. Pat. No. 5,534,347, incorporated herein by reference. The fluorocarbon polymer dispersed in the barrier layer coating composition, advantageously, can be in the form of a fluorocarbon resin powder, such as disclosed in copending U.S. patent application of Chen et al., Ser. No. 08/729,972, filed Oct. 15, 1996, which is incorporated herein by reference. The average particle sizes of fluorocarbon polymer particles dispersed in the coating composition are, preferably, from 10 to 60 μm, more preferably from 15 to 50 μm, and, most preferably, from 20 to 40 μm.

The relative amounts of the components of the barrier layer coating composition can vary considerably. Useful ranges, expressed in weight percent of the total liquid coating composition are as follows: fluorocarbon polymer, 20 to 40%, preferably, 30 to 40%; polyurethane, 40 to 60%, preferably, 45 to 55%; filler, 2 to 20%, preferably, 5 to 15%. The solids content of the composition is in the range from 20 to 50 wt. %, the rest being water, organic solvents, and any minor addenda such as colorant, urethane curing agent and catalyst, the VOC content being less than 3.5 pounds per gallon of the composition, minus water.

The fluorocarbon polymer is present in the coating composition as a uniform dispersion of fine solid particles that require no curing. After the coating operation, however, the coated roll is baked at elevated temperatures, e.g., 100° to 150° C. to cure the polyurethane in which the fluorocarbon polymer is dispersed. For this purpose the coating composition contains a minor amount of a urethane curing agent and a catalyst. Useful curing agents include materials such as ethylenediamine, the compound known as Xama-2, marketed by Virginia Chemical Co., a subsidiary of Celanese Corp., and identified as (β-(N-aziridinyl) -propionate, and the Cymel melamine resins, such as Cymel-303, Cymel-380 and Cymel-385, marketed by American Cyanamide Co. and disclosed in U.S. Pat. No. 5,233,008, which is incorporated herein by reference. Useful catalysts include tertiary amines (both aliphatic and cycloaliphatic) such as triethyl amine and organometallic compounds such as dibutyl tin dilaurate and tin octoate.

A characteristic of the aqueous dispersion, from which the barrier layer is formed in the method of the present invention, is that the solid particles of fluorocarbon polymer dispersed in the coating composition migrate to the top of the layer when the composition is coated over a silicone elastomer layer on the roll core. The polyurethane component of the composition is compatible with the underlying silicone layer and can adhere to it suitably without a primer. However, since the upper surface of the barrier layer will contain a high concentration of the fluorocarbon polymer particles, that surface can benefit from application of a primer when a silicone rubber layer is coated over it.

A preferred class of compounds for priming the barrier layer before applying the silicone top layer to the roll is of the general formula, $(R\_O)_n—SiR_m—Y$, wherein Y is aminoalkyl of 1 to 7 carbon atoms, aminoalkyleneaminoalkyl of 2 to 7 carbon atoms, or aminoaryl of 6 to 12 carbon atoms, R and R' are each alkyl of 1 to 7 carbon atoms, n is an integer from 1 to 3, m is an integer from 0 to 2 and n+m=3.

Especially preferred as primers are compounds of the formula, $H_2N-CH_2CH_2-NH-CH_2CH_2CH_2Si(OR'')_3$, wherein R" is lower alkyl, e.g., of 1 to 6 carbon atoms. Especially useful is the compound, N-(2aminoethyl)-3-aminopropyl-trimethoxysilane. This compound is available as A700 priming agent from United Chemical Co.

The following examples illustrate the preparation of fusing devices of the invention and testing of such devices.

EXAMPLE 1

Preparation of a Two Layer Fusing Roll Having a Barrier Layer

A cylindrical aluminum core was coated with a conventional silicone priming agent, namely, GE-4044 silane primer. The primed core was dried and coated with a layer of EC-4952 silicone elastomer (red rubber) which was then cured by a 12 hour ramp to 200° C. and 18 hours at 200° C. to provide a resilient silicone underlayer having a dry thickness of 2.5 mm. The roll was exposed to corona discharge treatment (CDT) at 640–650 watts for 1¼ minute. The silicone underlayer was then ring coated with Xylan 1237 dispersion, dried 2 hours and cured at 110° C. for 1½ hour. The roller was cut into strips for peel-testing on an Instron apparatus. The barrier layer could not be separated or removed from the silicone base cushion layer. The adhesion was very strong between the barrier layer and the resilient silicone layer. This demonstrates that the lower surface of the Xylan 1237 layer, where the polyurethane concentration is highest, adheres well to silicone rubber.

EXAMPLE 2

Preparation of a Tri-layer Fusing Roll Having a Barrier Layer

A fusing roll having an EC-4952 silicone base cushion layer of 2.5 mm thickness was corona discharge treated at 640–660 watts for about 1¼ minutes. Then the silicone bottom layer was ring coated with the barrier layer solution as in Example 1, dried for 1 hour and cured for 1 hour at 110° C. The resulting barrier layer was treated with a primer composition prepared by dissolving 0.5 g of A700 priming agent with 0.5 g of distilled water, allowing the mixture to sit for 20 minutes, then mixing with 230 g of acetone. The roll was dried for ½ hour and cured at 110° C. for ½ hour. The primer-treated barrier layer of the roll was then coated with EC-4952 silicone red rubber and cured by a 12 hour ramp to 200° C. and 18 hours at 200° C. Three 2"×2" areas were cut from the roller for peel testing. The barrier layer could not be separated from the top silicone layer or from the bottom silicone layer.

EXAMPLE 3

(A) Life Test

A fusing roll, prepared as described in Example 2, having a dried and cure coating of Xylan 1237 as a barrier layer was life tested in an EKTAPRINT 235 fuser assembly at ambient conditions for duplex copying mode. After 1.5 million copies, the roller showed no sign of delamination of the layers.

(B) Peel Test

The roll of Example 2 was taken from the life test machine and subjected to an Instron peel test. No separation was obtained.

EXAMPLE 4

Three Layer Roll Overcoated With Xylan 1237 Barrier Layer and Silicone Layer A standard three-layer fusing roll having a (90 mil) 2.3 mm silicone rubber underlayer, a 25 μm Viton B50 polytetrafluoroethylene barrier layer and a 0.25 mm silicone top layer was ring coated with a layer of Xylan 1237 and a surface layer of silicone rubber. An Instron peel test for separation of the Viton B50 barrier layer from the silicone rubber layer was 65 gm, but the Xylan 1237 barrier layer could not be separated from any of the silicone rubber surface layer.

Comparative Examples 1 and 2

Following the same procedure as described in Example 2, except that no primer was applied over the Xylan 1237 barrier layer, two fusing rolls having three layers (EC-4952+Xylan 1237+EC-4952) were prepared and subjected to peel tests. The peel strengths between the silicone surface layer and the Xylan 1237 barrier layer were 6.6 gm and 20.1 gm, respectively, which were below the desired minimum peel strength of 35 gm. This demonstrates that, although the Xylan 1237 adheres strongly to a silicone underlayer, advantageously, its upper surface is treated with a primer such as A700 priming agent from United Chemical Co. for good adhesion to a silicone overlayer. This illustrates the fact that the fluorocarbon polymer particles migrate to the top of the Xylan 1237 layer, forming an upper surface rich in fluorocarbon polymer that benefits from priming for adhesion to silicone, and a lower surface rich in polyurethane ionomer that adheres well to silicone without a primer.

Comparative Examples 3 and 4

Two cured fusing rolls, prepared as described in Example 1 and having an EC 4952 silicone base cushion layer overcoated with a Xylan 1237 barrier layer, were then ring coated without a priming layer with a 25 μm surface layer of Silastic E silicone rubber which was addition cured by a 4 hour ramp to 200° C. and 12 hours at 200° C. Each roll was then subjected to peel tests. The peel strength between the Xylan 1237 barrier layer and the addition-cured Silastic E surface layer for one roll was 19.8 gm and for the other was 34 g. This shows that the use of a priming agent between the polyurethane-fluorocarbon polymer barrier layer and the silicone rubber overcoat is preferred.

A further test of the properties of the Xylan 1237 polymer composition was made by forming a thin film of the composition, followed by drying and curing for one hour at 110° C. Three samples of resulting film were soaked in DC 200 polydimethylsiloxane oil, 350 cps, for seven days at 350° F. Hardness, thickness and weight of the film samples before and after soaking in PDMS oil were as follows:

| | Sample | Before | After |
|---|---|---|---|
| Shore A Hardness | 1 | 90 | 90 |
| | 2 | 90 | 90 |
| | 3 | 91 | 91 |
| Thickness (mm) | 1 | 0.009 | 0.009 |
| | 2 | 0.007 | 0.007 |
| | 3 | 0.006 | 0.006 |
| Weight (gm) | 1 | 0.091 | 0.083 |
| | 2 | 0.062 | 0.054 |
| | 3 | 0.051 | 0.044 |

The tests showed that, although the films lost some weight, there are no change in hardness or thickness. Thus, there was no oil swelling of the Xylan 1237 coating by the PDMS release oil and the material has outstanding properties as a barrier layer that is impervious to silicone oil.

Although the invention has been described in detail with particular reference to certain preferred embodiments thereof, it should be appreciated that variations and modifications can be effected within the spirit and scope of the invention.

What is claimed is:

1. A toner fusing roll comprising a core, formed on said core a resilient silicone rubber layer, and coated on said silicone rubber layer a barrier layer that is impervious to silicone oil and that comprises a fluorocarbon polymer dispersed in a polyurethane.

2. A roll according to claim 1 wherein said fluorocarbon polymer is in a finely divided particulate form and said polyurethane is a cured polyurethane ionomer.

3. A roll according to claim 2 wherein said fluorocarbon polymer is present in said dispersion in finely divided particulate form.

4. A roll according to claim 3 wherein the thickness of the silicone rubber layer formed on said core is about 0.25 to 12 mm, the thickness of the barrier layer is about 0.25 to 0.075 mm, and the thickness of the silicone rubber layer coated over the barrier layer is about 0.025 to 0.5 mm.

5. A roll according to claim 4 wherein said priming agent is a compound of the formula:

$(R\_O)_n$—$SiR_m$—Y, wherein Y is aminoalkyl of 1 to 7 carbon atoms, aminoalkyleneaminoalkyl of 2 to 7 carbon atoms, or aminoaryl of 6 to 12 carbon atoms, R and $R^1$ are each alkyl of 1 to 7 carbon atoms, n is an integer from 1 to 3, m is an integer from 0 to 2 and n+m=3.

6. A roll according to claim 5 wherein said priming agent is N-(2-aminoethyl)-3-aminopropyl-trimethoxysilane.

7. A roll according to claim 3 comprising a priming agent coated over said barrier layer and a silicone rubber layer coated over said priming agent.

8. A roll according to claim 7 wherein said priming agent is of the formula $H_2N$—$CH_2CH_2$—NH—$CH_2CH_2CH_2Si(OR")_3$, wherein R" is lower alkyl.

9. A roll according to claim 1 wherein said barrier layer is coated on said silicone layer from a dispersion containing water, a polyurethane ionomer and one or more organic solvents for said polyurethane.

10. A roll according to claim 1 further comprising a resilient silicone rubber layer coated over said barrier layer.

11. A method for forming a toner fusing roll which comprises forming on a core for said fusing roll a resilient silicone rubber layer, and coating the silicone rubber layer with an aqueous dispersion comprising a fluorocarbon polymer, a polyurethane ionomer, and at least one organic solvent for said polyurethane ionomer, the total amount of volatile organic compounds in said dispersion not exceeding 3.5 pounds per gallon of dispersion, minus water.

12. A method according to claim 11 wherein said fluorocarbon polymer is present in the dispersion in finely divided particulate form.

13. A method according to claim 12 wherein said dispersion also contains a curing agent and curing catalyst for polyurethane and said dispersion is dried and cured after being coated on the silicone layer.

14. A method according to claim 13 wherein a priming agent of the formula $H_2N$—$CH_2CH_2$—NH—$CH_2CH_2CH_2Si$—$(OR")_3$, wherein R" is lower alkyl, is coated over the dried and cured dispersion and, thereafter, a silicone rubber layer is coated over said priming agent.

* * * * *